(12) United States Patent
Yamada et al.

(10) Patent No.: US 9,158,618 B2
(45) Date of Patent: Oct. 13, 2015

(54) MEMORY DIAGNOSTIC METHOD, DEVICE, AND NON-TRANSITORY COMPUTER-READABLE STORAGE MEDIUM FOR DIAGNOSING A MEMORY USED BY A PROCESS DURING EXECUTION OF THE PROCESS

(75) Inventors: Hiroshi Yamada, Chiyoda-ku (JP);
Yasuharu Itano, Chiyoda-ku (JP);
Etsuji Matsuyama, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 189 days.

(21) Appl. No.: 13/579,982

(22) PCT Filed: Mar. 11, 2010

(86) PCT No.: PCT/JP2010/054143
§ 371 (c)(1),
(2), (4) Date: Aug. 20, 2012

(87) PCT Pub. No.: WO2011/111211
PCT Pub. Date: Sep. 15, 2011

(65) Prior Publication Data
US 2012/0324294 A1   Dec. 20, 2012

(51) Int. Cl.
*G06F 11/10* (2006.01)
(52) U.S. Cl.
CPC ........ *G06F 11/1004* (2013.01); *G06F 11/1008* (2013.01); *G06F 11/10* (2013.01)
(58) Field of Classification Search
CPC ..... G06F 3/0619; G06F 11/10; G06F 11/104; G06F 11/1008
USPC .......................................................... 714/719
See application file for complete search history.

(56) References Cited

U.S. PATENT DOCUMENTS 5,450,321 A * 9/1995 Crane .......................... 701/31.6
5,894,549 A * 4/1999 Cheng ............................. 714/42

(Continued)

FOREIGN PATENT DOCUMENTS

CN   1435758 A   8/2003
JP   59-124097 A   7/1984

(Continued)

OTHER PUBLICATIONS

International Search Report (PCT/ISA/210) issued on Nov. 9, 2010, by the Japanese Patent Office as the International Searching Authotily for International Application No. PCT/JP2010/054143.
Written Opinion (PCT/ISA/237) issued on Nov. 9, 2010, by the Japanese Patent Office as the International Searching Authority for International Application No. PCT/JP2010/054143.

(Continued)

*Primary Examiner* — Joseph Schell
(74) *Attorney, Agent, or Firm* — Buchanan Ingersoll & Rooney PC

(57) ABSTRACT

In a memory diagnostic method, a fixed domain stores data that are not changed during process execution. A variable domain stores data that are subject to writing during process execution. A fixed domain diagnostic part adds an error-detecting code to data to be stored in the fixed domain. The fixed domain diagnostic part compares an error-detecting code calculated from data read from the fixed domain with the added error-detecting code to determine whether there is any data error. A variable domain diagnostic part temporarily stores data stored in the variable domain in a memory region different from the memory storing the data, and writes known data in the variable domain where the temporarily stored data were stored. The variable domain diagnostic part reads data from the region where the known data were written and determines whether the data is the same as the written known data.

11 Claims, 13 Drawing Sheets

(56) References Cited

U.S. PATENT DOCUMENTS

| | | | |
|---|---|---|---|
| 6,295,617 B1 | 9/2001 | Sonobe | |
| 6,430,709 B1* | 8/2002 | Watanabe | 714/42 |
| 7,143,314 B2* | 11/2006 | Costin | 714/38.13 |
| 7,287,204 B2 | 10/2007 | Mayer et al. | |
| 2002/0049931 A1* | 4/2002 | Goto | 714/42 |
| 2005/0060603 A1 | 3/2005 | Pomaranski et al. | |
| 2009/0235019 A1* | 9/2009 | Costin et al. | 711/105 |

FOREIGN PATENT DOCUMENTS

| | | |
|---|---|---|
| JP | 2002-288047 A | 10/2002 |
| JP | 2006-268266 A | 10/2006 |

OTHER PUBLICATIONS

IEC 61508 Overview Report, A Summary of the IEC 61508 Standard for Functional Safety of Electrical/Electronic/Programmable Electronic Safety-Related Systems, Version 2.0, Jan. 2, 2006, pp. 1-29.
Extended European Search Report issued on Oct. 14, 2013, by the European Patent Office in corresponding European Patent Application No. 10847441.2. (6 pages).
Jul. 2, 2014 Chinese Office Action issued in Chinese Patent Application No. 201080065344.0 (with English language translation).
Office Action issued on Mar. 6, 2015, by the Chinese Patent Office in corresponding Chinese Patent Application No. 201080065344.0 and an English translation of the Office Action. (28 pages).

* cited by examiner

MEMORY DIAGNOSTIC METHOD, DEVICE, AND NON-TRANSITORY COMPUTER-READABLE STORAGE MEDIUM FOR DIAGNOSING A MEMORY USED BY A PROCESS DURING EXECUTION OF THE PROCESS

TECHNICAL FIELD

The present invention relates to a memory diagnostic method, memory diagnostic device, and memory diagnostic program performing diagnostics on memory rewritable by process.

BACKGROUND ART

International standards regarding the safety of electric, electronic, and programmable electronic functions have been established in the process industry (see Non-Patent Literature 1). The Non-Patent Literature 1 targets electric and electronic devices of which the function or malfunction/failure has significant influence on human lives. For example, these targets include the safety of functions of transport machines, chemical plants, and medical devices.

Influential factors on the safety presumably include, in regard mainly to hardware, deterioration in parts and/or materials and random hardware failure due to variation among products. The Non-Patent Literature 1 sets forth necessity of improvement in system reliability by redundant and/or diversified configuration and measures such as provision of self-diagnostic functions. Furthermore, the Non-Patent Literature 1 prescribes that the safety integrity level (SIL) of a safety device should be determined by probabilistic risk analysis or the like so that the entire system risk falls below an acceptable risk. The Non-Patent Literature 1 sets forth four required safety integrity levels from the relatively low level, SIL 1, to the highest level, SIL 4. The Non-Patent Literature 1 recommends failure detection and diagnostics for the SIL 2 and strongly recommends failure detection and diagnostics for the SIL 3 and SIL 4.

With devices in which a CPU (central processing unit) runs programs for processing, the programs are generally read from a ROM (read-only memory) to a high access-speed RAM (random-access memory) for high speed program operation. Therefore, both data subject to change and data not subject to change while the programs are running are present in the RAM.

Data stored in a RAM may be subject to unintended change due to malfunction of the RAM, defects upon manufacturing, or cosmic radiation. In order to routinely confirm that the data stored in a RAM is normal, diagnostics using a program or some other logic circuit is necessary.

For example, the Patent Literature 1 describes a method of checking a storage means while a control target is controlled. The method of checking a storage means of the Patent Literature 1 is a method of checking a RAM bank comprising the banks of multiple RAMs storing data, wherein the banks of two RAMs to be checked are subject to the same checking procedure (control operation and monitor operation) and it is determined whether the results of the two operations (check results) are equal. The results of control operation and monitor operation are written in the banks of the RAMs, the written values are read, and it is determined whether their values are equal.

PRIOR ART LITERATURE

Patent Literature

Patent Literature 1: Unexamined Japanese Patent Application KOKAI Publication No. 2002-288047.

Non-Patent Literature

Non-Patent Literature 1: IEC 61508-1 to IEC 61508-7, International Electrotechnical Commission: 1998-12 to 2003-03.

DISCLOSURE OF INVENTION

Problems to be Solved by the Invention

For diagnosing data subject to change during process execution by cyclic redundancy check (CRC), dual writing (double RAM), or the like the verifying data (CRC codes or comparing data) should be rewritten at the same time as the data are changed. Then, software processing becomes complex.

For diagnostics on data not subject to change during process execution by a checkerboard, walk bits, or the like the diagnostic procedure itself may be rewritten. Therefore, writing and reading should be conducted while monitoring the program operation. Then, software processing becomes complex.

The present invention is invented in view of the above circumstances and an exemplary object of the present invention is to provide a memory diagnostic method, a memory diagnostic device, and a memory diagnostic program in order to perform relatively easily diagnostics on a memory used by a process during execution of the process.

Means for Solving the Problems

The memory diagnostic method according to a first exemplary aspect of the present invention is a method of performing diagnostics on a memory used by a process during execution of the process. The variable domain diagnostic step is a step with the variable domain of the memory storing first data that are possibly subject to writing by the process, comprising storing the first data stored in the variable domain in a withdrawal region different from the memory region storing the first data, and writing known data in the variable domain where the first data stored in the withdrawal region were stored. Then, the variable domain diagnostic step comprises reading the data in the region where the known data are written and determining whether they are equal to the written known data. On the other hand, the fixed domain diagnostic step is a step with the fixed domain that is a domain of the memory storing second data that are not subject to change during execution of the process, comprising adding an error-detecting code to data to be stored and storing it in the fixed domain in advance. Then, the fixed domain diagnostic step comprises comparing the error-detecting code calculated from the data read from the fixed domain with the added and stored error-detecting code to determine whether there is any data error.

The memory diagnostic device according to a second exemplary aspect of the present invention diagnoses a memory used by a process during execution of the process. With the variable domain of the memory storing first data that are possibly subject to writing by the process, the variable domain diagnostic part stores the first data stored in the variable domain in a withdrawal region different from the memory region storing the first data, and writes known data in the variable domain where the first data stored in the withdrawal region were stored. Then, the variable domain diagnostic part reads the data in the region where the known data are written and determines whether they are equal to the written known data. On the other hand, with the fixed domain that is a domain of the memory storing second data that are not subject to change during execution of the process, the fixed domain diagnostic part adds an error-detecting code to data to be stored and stores it in the fixed domain in advance. Then, the fixed domain diagnostic part compares the error-detecting code calculated from the data read from the fixed domain with the added and stored error-detecting code to determine whether there is any data error.

The memory diagnostic program according to a third exemplary aspect of the present invention allows a computer to execute the memory diagnostic method according to the first exemplary aspect of the present invention while the computer executes processes.

Advantageous Effects of Invention

The present invention can relatively easily diagnose a memory in which both data that are not rewritten and data that are possibly rewritten by a process are present during execution of the process.

DESCRIPTION OF EMBODIMENTS

Embodiment 1

Figure 1:
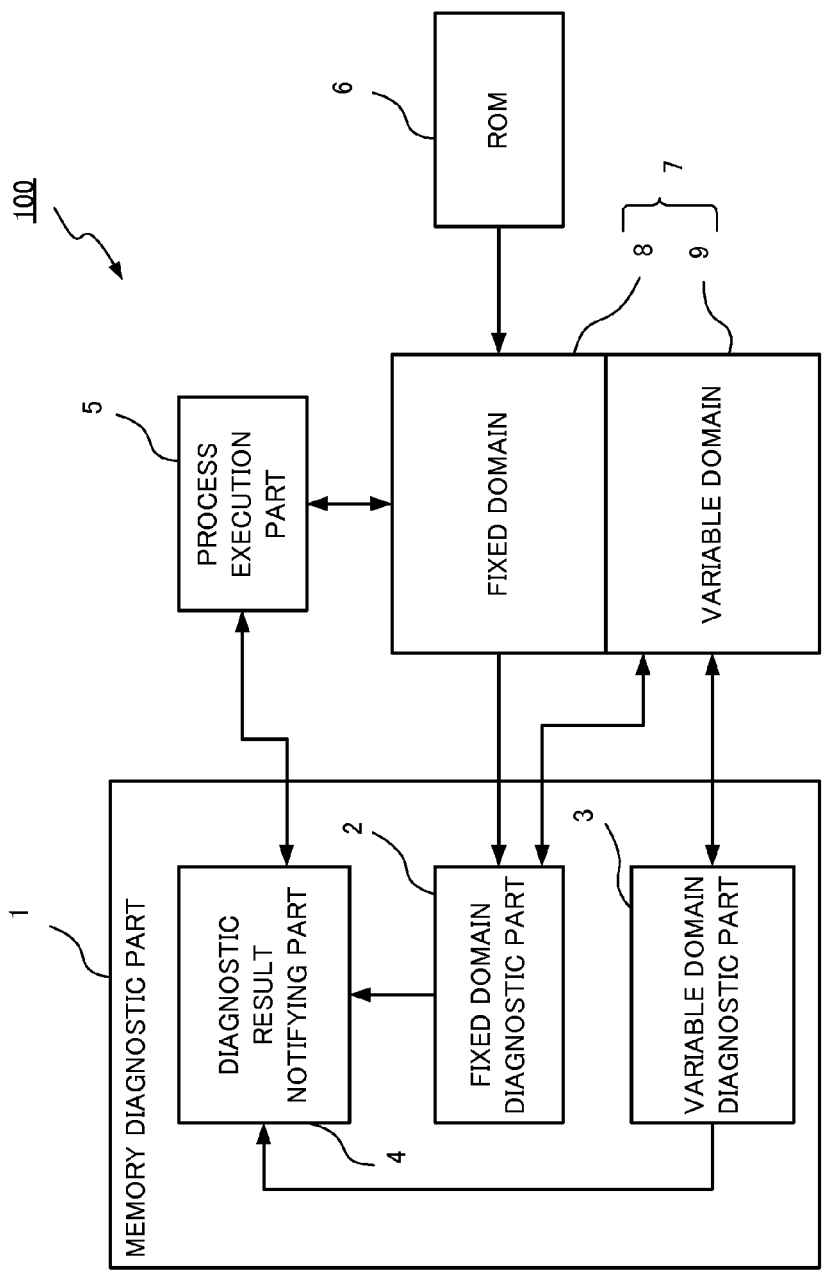
FIG. 1 is a block diagram showing an exemplary configuration of the process execution device according to Embodiment 1 of the present invention.

FIG. 1 is a block diagram showing an exemplary configuration of the process execution device according to Embodiment 1 of the present invention. A process execution device 100 is composed of a memory diagnostic part 1, a process execution part 5, a ROM (read only memory) 6, and a RAM (random access memory) 7. The RAM 7 is divided into a fixed domain 8 and a variable domain 9. The memory diagnostic part 1 comprises a fixed domain diagnostic part 2, a variable domain diagnostic part 3, and a diagnostic result notifying part 4.

The ROM 6 stores programs, constant data, and other data for processing by the process execution part 5. The programs and constant data in the ROM 6 are loaded onto the fixed domain 8 of the RAM 7. With a CPU running programs loaded on the RAM 7 from the ROM 6 using the RAM 7 and an input/output device as resources, the process execution part 5 executes procedures intended for the process execution device 100.

The fixed domain 8 of the RAM 7 is a domain where programs and constant data stored in the ROM 6 are loaded and no data are rewritten during process execution. The variable domain 9 of the RAM 7 is a storage domain used as a work area during process execution. The variable domain 9 stores variables, constants, and various temporarily stored parameters, and CPU stack during process execution. The diagnostic target in this embodiment is the RAM 7. However, the diagnostic target can be a NVRAM (nonvolatile RAM: nonvolatile memory), EEPROM (electrically erasable programmable ROM), or flash ROM as long as they are a rewritable storage medium. Furthermore, the diagnostic target is not restricted to one type of storage medium and can be a combination of a RAM, NVRAM, and EEROM.

The fixed domain diagnostic part 2 of the memory diagnosis part 1 conducts diagnosis as to whether the data stored in the fixed domain 8 of the RAM 7 are correct during processing of the process execution part 5. For diagnosis on the fixed domain 8, an error-detecting code is added to data to be stored in the fixed domain 8 in advance and the error-detecting code calculated from the data read from the fixed domain 8 is compared with the added and stored error-detecting code to determine whether there is any data error.

The variable domain diagnosis part 3 conducts diagnosis as to whether the variable domain 9 of the RAM 7 operates normally during processing of the process execution part 5. For diagnosis on the variable domain 9, data stored in the variable domain 9 are stored in a withdrawal region different from the region storing the data, and known data are written in the variable domain 9 where the data were stored. Then, the data in that region are read and it is determined whether they are equal to the written known data.

The known data are data of which the bit pattern is known by the variable domain diagnosis part 3 before being written in the variable domain 9 and that can be compared with other data by the variable domain diagnosis part 3 after being written in the variable domain 9. The known data may be fixed data defined by program data or data created through some arithmetic operations using a program or logical operation circuit. The fixed data include those selected from multiple bit patterns. The data created through arithmetic operations include, for example, data calculated from the number of times of memory diagnosis and/or times when memory diagnosis is conducted using a given arithmetic operation formula, data having a bit pattern created by generating pseudo-random numbers. The data created through arithmetic operations can be data read from the variable domain 9 and bit-inverted.

When the fixed domain diagnostic part 2 or variable domain diagnosis part 3 detects any data error, the diagnostic result notifying part 4 notifies the process execution part 5 of the data error.

In Embodiment 1, like the process execution part 5, with a CPU running programs loaded on the RAM 7 from the ROM 6 using the RAM 7 as a resource, the memory diagnosis part 1 executes a memory diagnosis procedure.

Figure 2:
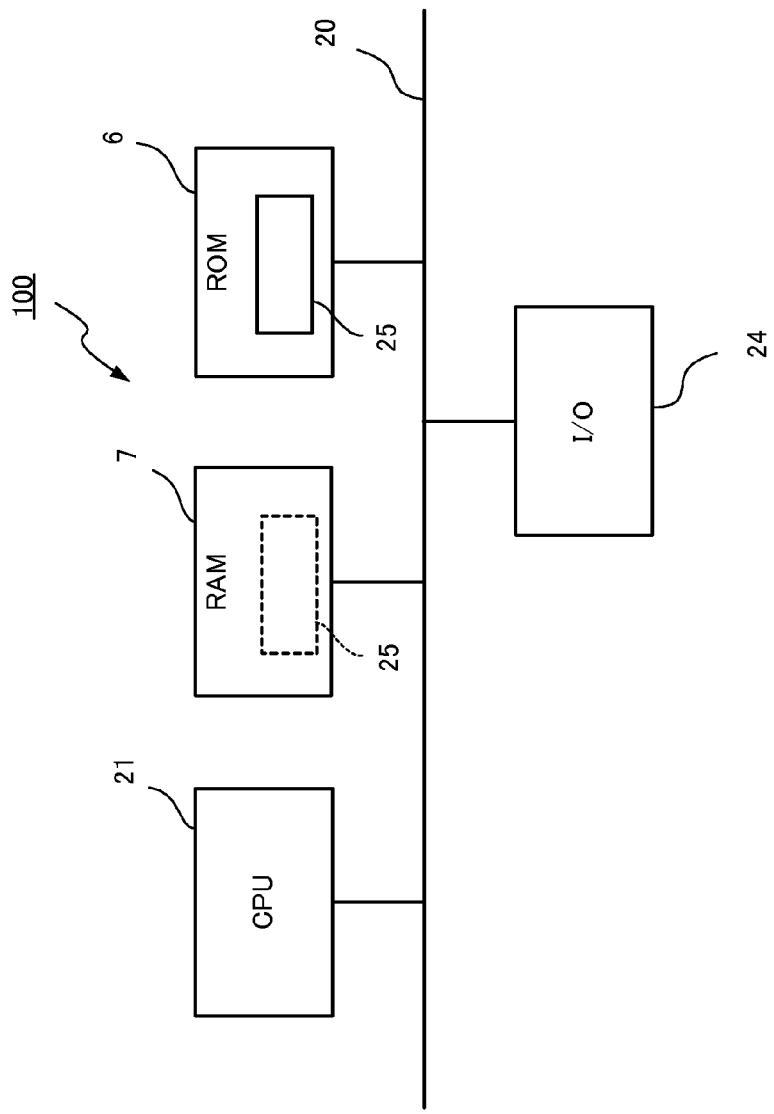
FIG. 2 is a block diagram showing an exemplary hardware configuration of the process execution device according to Embodiment 1.

FIG. 2 is a block diagram showing an exemplary hardware configuration of the process execution device according to Embodiment 1. The process execution device 100 comprises, as shown in FIG. 2, a CPU 21, a RAM 7, a ROM 6, and an I/O 24. The RAM 7, ROM 6, and I/O 24 are all connected to the CPU 21 via an internal bus 20.

As control programs 25 stored in the ROM 6 and loaded on the RAM 7 run on the CPU 21, the procedures of the process execution device 100 are executed.

Loaded with the control programs 25 stored in the ROM 6, the RAM 7 is used as a work area of the process execution part 5 and a memory diagnostic part 1. In the example shown in FIG. 2, the diagnostic target is an external RAM of the CPU 21. However, it can be an internal RAM of the CPU 21.

The ROM 6 is composed of a conventional read-only memory. However, it may be composed of a nonvolatile memory such as a flash memory, hard disc, DVD-RAM (digital versatile disc random access memory), and DVD-RW (digital versatile disc rewritable). The ROM 6 stores programs for implementing processing of the process execution part 5 and the memory diagnostic part 1 using the CPU 21.

The I/O 24 makes connection to various input/output devices or communication devices for the process execution device 100 to transmit/receive data to/from external devices, and is composed of a serial interface or parallel interface. The process execution device 100 inputs/outputs data from/to external devices via the I/O 24.

Figure 3:
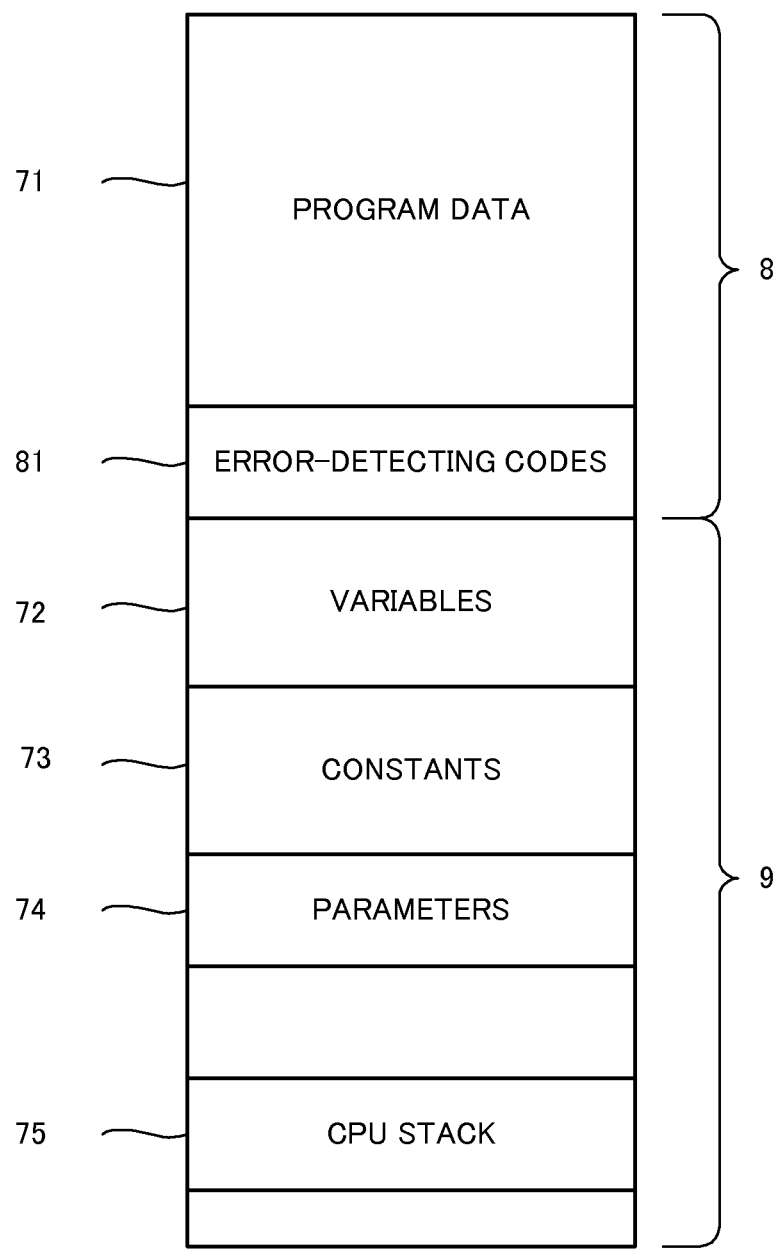
FIG. 3 is an illustration showing exemplary RAM assignment of the process execution device according to Embodiment 1.

FIG. 3 is an illustration showing exemplary RAM assignment of the process execution device according to Embodiment 1. The RAM 7 stores various data such as program data (control and diagnosis) 71, variables 72, constants 73, operation-related parameters 74, and CPU stack 75. The RAM 7 further stores program data error-detecting codes 81. The program data 71 and error-detecting codes 81 are contained in the fixed domain 8. The other variables 72, constants 73, parameters 74, and CPU stack 75 are contained in the variable domain 9.

In this embodiment, the error detection method used in diagnosis within the fixed domain 8 includes error detection using dual writing, parity codes, checksums, Hamming codes, cyclic redundancy check (CRC), or Hash functions. Dual writing reference data or their bit-inverted data are a type of error-detecting code 81. In this embodiment, the error-detecting codes include error-detecting/correcting codes.

The fixed domain diagnostic part 2 adds an error-detecting code 81 to data to be stored in the fixed domain 8 before the process execution part 5 starts processing. Then, during processing of the process execution part 5, the error-detecting code calculated from data read from the fixed domain 8 is compared with the error-detecting code 81 added in advance to determine whether there is any data error.

Figure 4:
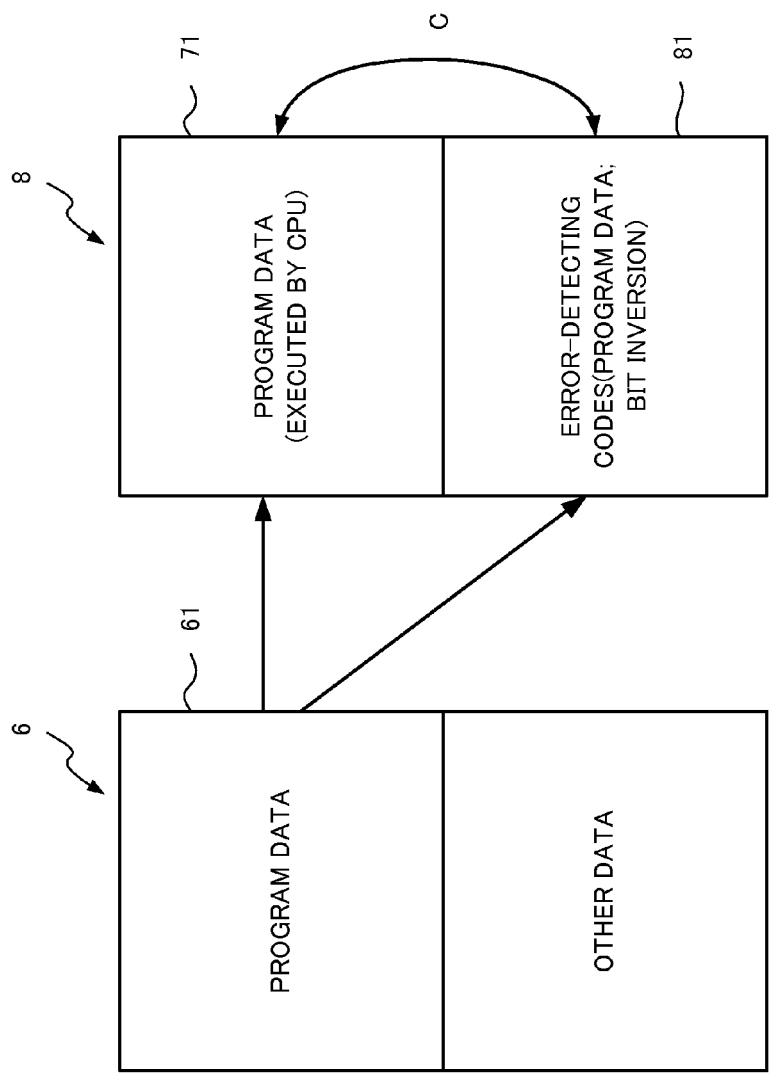
FIG. 4 is an illustration for explaining exemplary fixed domain diagnostics according to Embodiment 1.

FIG. 4 is an illustration for explaining exemplary fixed domain diagnosis according to Embodiment 1. In the example of FIG. 4, the error-detecting code 81 consists of bit-inverted program data. Writing bit-inverted data is a type of dual writing. As the process execution device 100 is activated, program data 61 in the ROM 6 are loaded on the fixed domain 8 of the RAM 7. The program data 71 loaded on the fixed domain 8 are executed by the CPU 21 so as to implement processing of the process execution part 5 and the memory diagnostic part 1.

The fixed domain diagnostic part 2 bit-inverts the program data and stores them in the fixed domain 8 as the error-detecting code 81 before the process execution part 5 starts processing. The fixed domain diagnostic part 2 reads program data 71 from the fixed domain 8, and bit-inverts and compares them with the corresponding error-detecting code 81 (bit-inverted program data) (the arrow C in FIG. 4) during processing of the process execution part 5. If there is any difference between the bit-inverted program data 71 and error-detecting code 81, the fixed domain diagnostic part 2 determines that the RAM 7 has failure on that part.

The fixed domain diagnostic part 2 does not need to compare the bit-inverted program data 71 with the error-detecting code 81 throughout the program data at a time. It is possible to divide the program data into proper blocks and conduct the bit inversion and comparison by block. Furthermore, the diagnosis performed on the fixed domain 8 can be paused and resumed at any time; therefore, it can be realized as a task of lower priority than processing of the process execution part 5.

Figure 5:
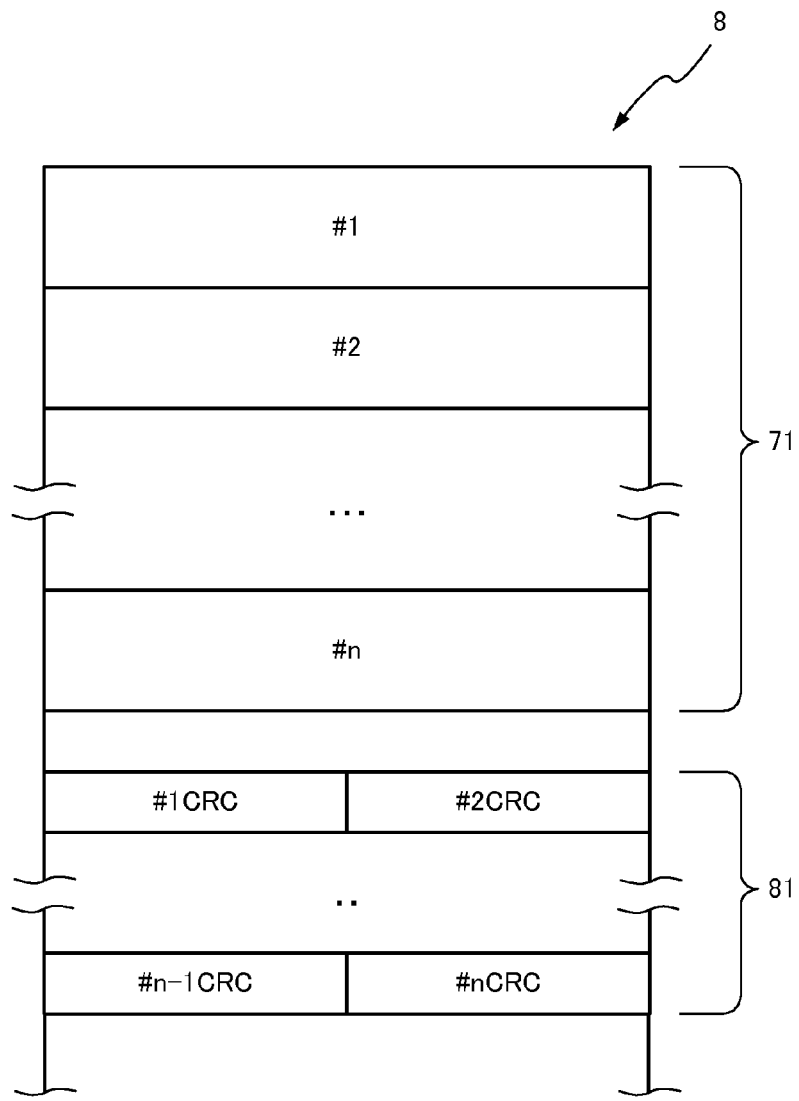
FIG. 5 is an illustration for explaining other exemplary fixed domain diagnostics according to Embodiment 1.

FIG. 5 is an illustration for explaining other exemplary fixed domain diagnostics according to Embodiment 1. In the example of FIG. 5, the error-detecting code 81 consists of cyclic redundancy check codes (CRC codes). The fixed domain diagnostic part 2 divides the program data 71 into blocks and calculates a CRC code for each block. The CRC codes are stored in a region different from the program data 71. In FIG. 5, the CRC codes for blocks #1 to #n are stored in #nCRC to #nCRC, respectively.

The fixed domain diagnostic part 2 stores the CRC codes for the blocks of the program data 71 in the fixed domain 8 before the process execution part 5 starts processing. The fixed domain diagnostic part 2 reads a block of the program data 71 from the fixed domain 8 in sequence and calculates its CRC code during processing of the process execution part 5. Then, the fixed domain diagnostic part 2 compares the stored CRC code for the block with the calculated CRC code. If there is any difference between the two CRC codes, the fixed domain diagnostic part 2 diagnoses that the block has failure. Also in this case, the diagnostics performed on the fixed domain 8 can be paused and resumed at any time; therefore, it can be realized as a task of lower priority than processing of the process execution part 5.

It is possible to further add an error-detecting code to the error-detecting code 81 of the program data 71 for diagnosing problems with the fixed domain 8 storing the error-detecting code 81. For example, a checksum and/or horizontal/vertical parity can be added to the error-detecting code 81 in FIG. 4 (bit-inverted program data) for diagnosing problems with the region storing the error-detecting code 81.

Figure 6A:
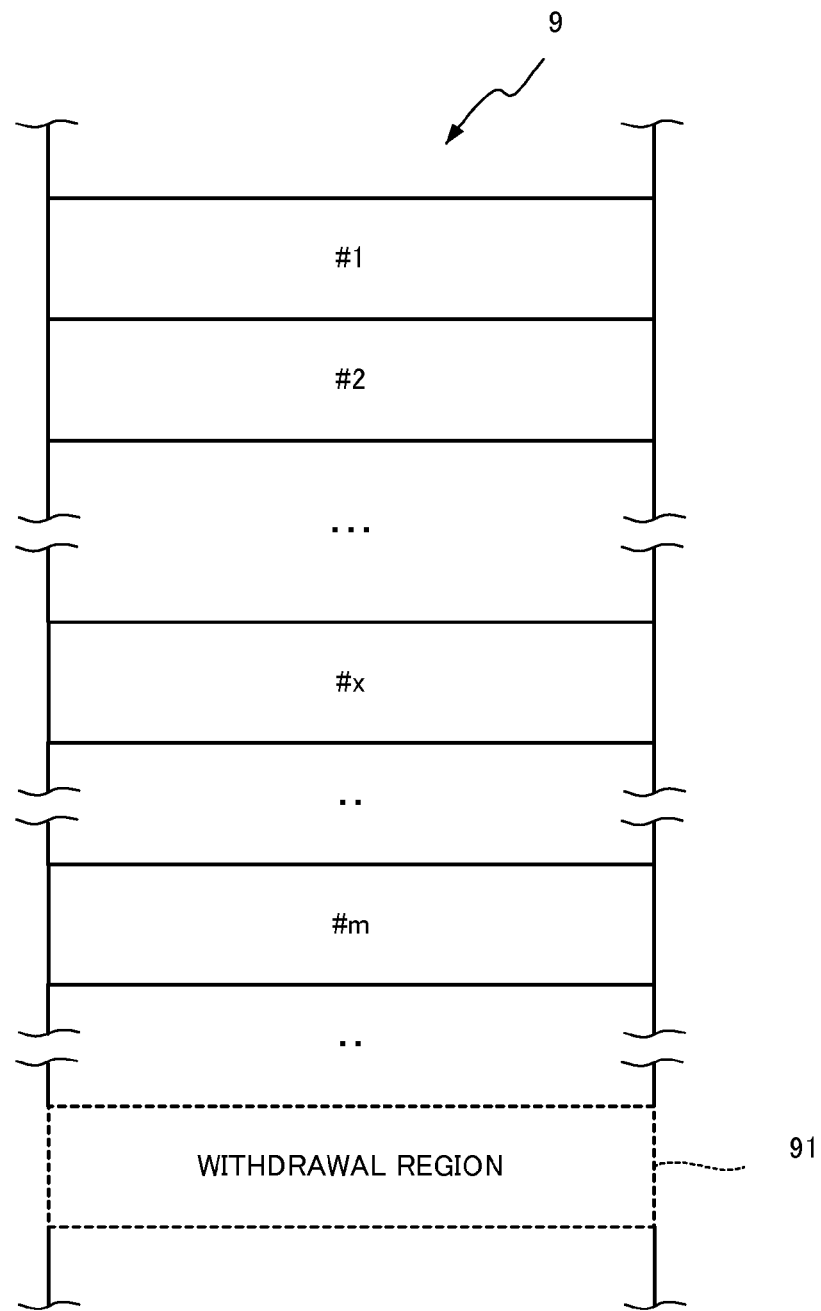
FIG. 6A is an illustration for explaining exemplary variable domain diagnostics according to Embodiment 1.
Figure 6B:
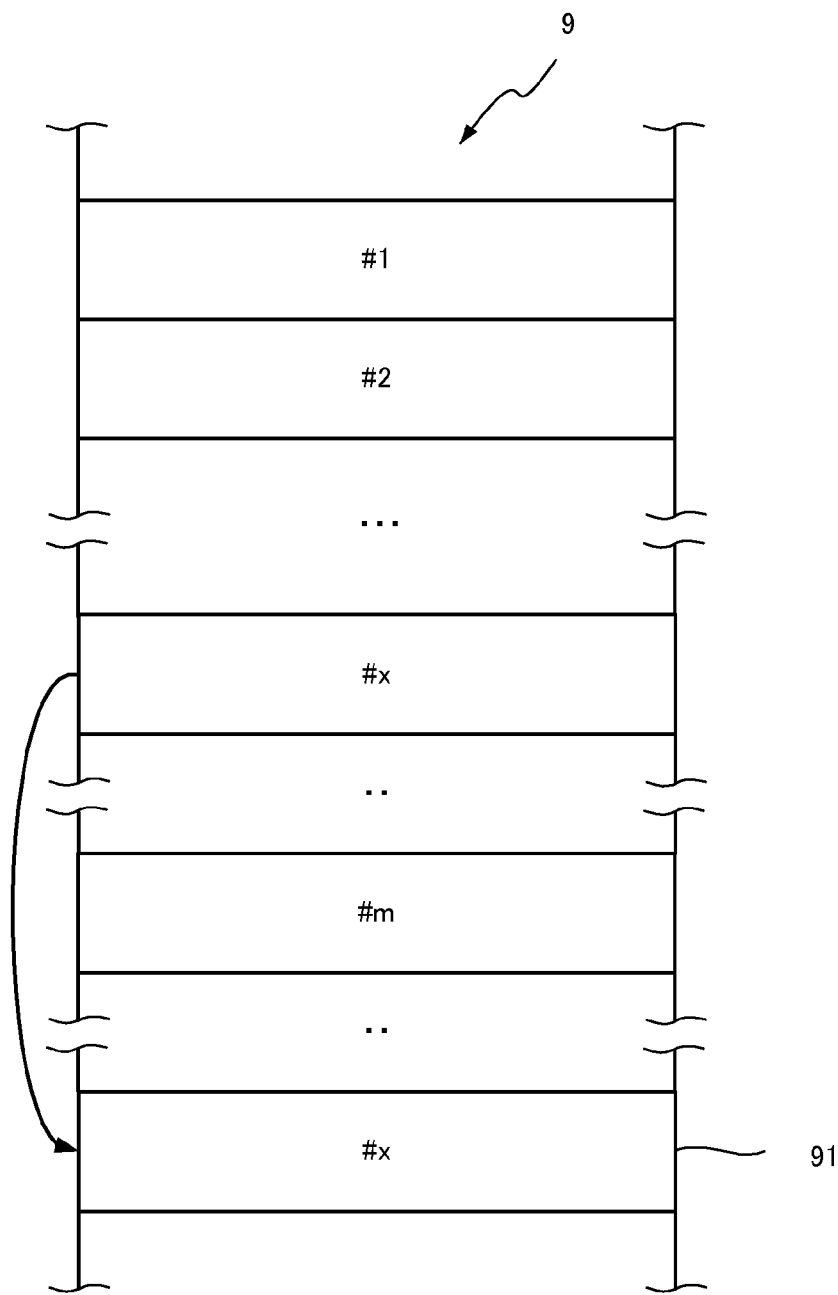
FIG. 6B is an illustration showing some data in the variable domain being stored in the withdrawal region.
Figure 6C:
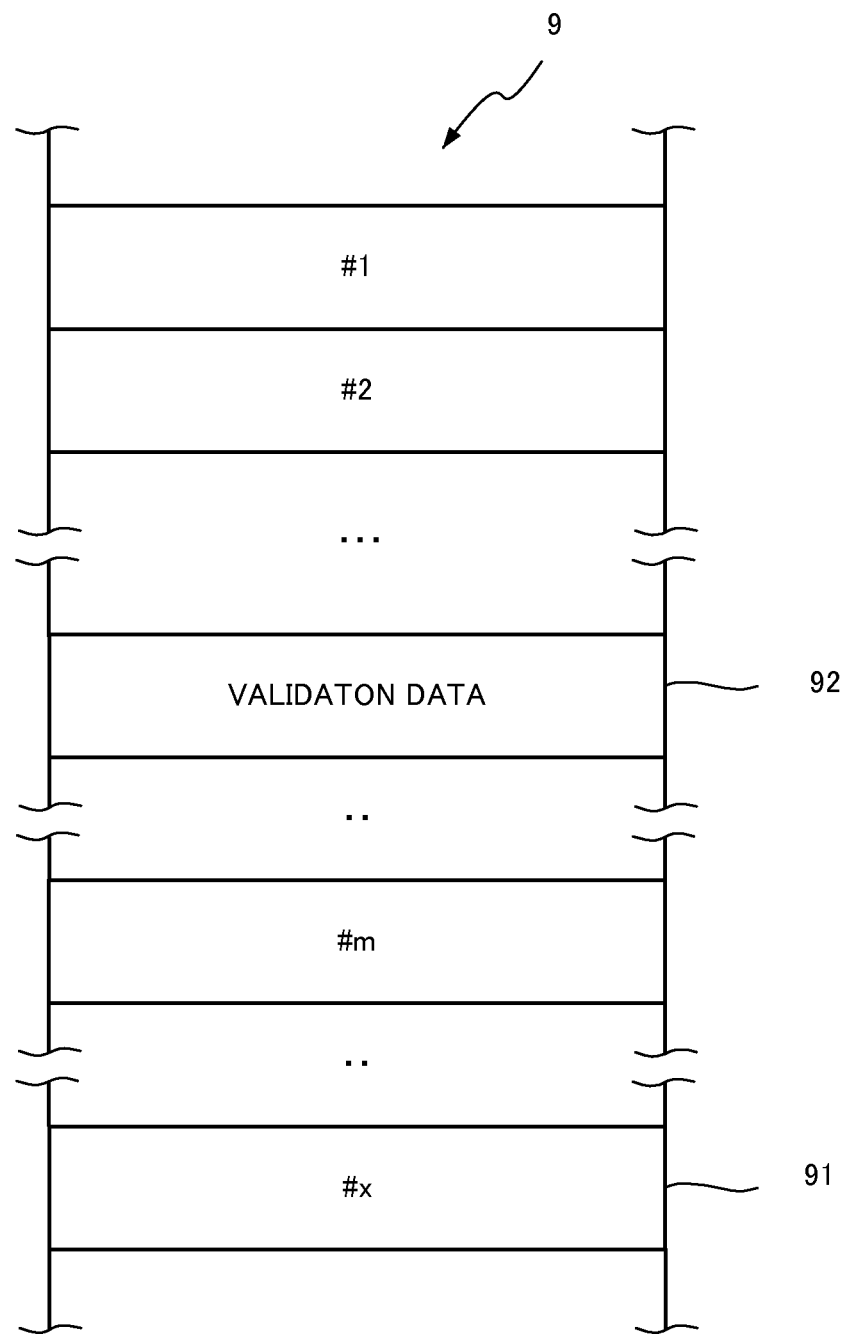
FIG. 6C is an illustration showing validation data being stored in a part of the variable domain.

FIGS. 6A to 6C are illustrations for explaining an exemplary variable domain diagnostics according to Embodiment 1. FIG. 6A shows the variable domain 9 divided into blocks with assignment of a withdrawal region 91. FIG. 6B is an illustration showing some data in the variable domain being stored in the withdrawal region. In FIG. 6B, the data in a block #x of the variable domain 9 are stored in the withdrawal region 91.

FIG. 6C is an illustration showing validation data being stored in a part of the variable domain. In the example of FIG. 6C, validation data 92 are stored in the withdrawn block #x. The validation data 92 are known data retained or created by the variable domain diagnostic part 3. The validation data 92 consist of, for example, all bit 1 data, all bit 0 data, data consisting of alternate bits 1 and 0 (1010 . . . or 0101 . . . ), or other fixed bit pattern data.

The variable domain diagnostic part 3 writes given validation data 92 in the region where the withdrawn data were stored. Then, the variable domain diagnostic part 3 reads the data from the region where the validation data 92 are written and compares them with the original written data. If there is any difference in bit between the written data and read data, the variable domain diagnostic part 3 determines that the RAM 7 has failure on that part. After reading the data from the region where the validation data 92 are written, the variable domain diagnostic part 3 writes the data stored in the withdrawal region in the original region. The withdrawal region 91 is freed so that it can store new data and the variable domain 9 of the RAM 9 returns to the state in FIG. 6A.

The variable domain diagnostic part 3 changes the block from which data are withdrawn and into which the validation data 92 are written in sequence so as to diagnose the RAM 7 by block. Furthermore, the variable domain diagnostic part 3 writes/reads the validation data 92 in/from the withdrawal region 91 to diagnose it. If the process execution part 5 does not use the withdrawal region 91, the data in the withdrawal region 91 does not need to be withdrawn into another region.

Since some data in the variable domain 9 are withdrawn into an idle region (the withdrawal region 91) of the RAM 7 and given validation data 92 are written in the region whether the withdrawn data were stored, it is desirable to conduct diagnostics on the variable domain 9 while at least processes using the withdrawn data are in their wait state. If possible, it is desirable to conduct diagnostics on the variable domain 9 while all processes of the process execution part 5 (excluding the processing of the memory diagnostic part 1) are in their wait state. Alternatively, it is possible to conduct diagnostics on one block of the variable domain 9 while the highest priority task of the process execution part 5 is in a wait state.

The variable domain diagnostic part 3 properly sets the size of blocks that are units of diagnostics on the variable domain 9 so as not to interfere with processing of the process execution part 5. For example, the block size is set so that the time to write the withdrawn data into the original region is shorter than the time for which interrupt processing of the highest priority of the process execution part 5 can wait. In this way, even if interruption occurs during variable domain diagnostics, processing of the process execution part 5 can be conducted without any problem by discontinuing the variable domain diagnostics and writing the withdrawn data in the original region.

The variable domain diagnostic part 3 can change the validation data 92 for diagnostics of each block of the variable domain 9. For example, it is possible to prepare multiple fixed bit patterns and select a different fixed bit pattern each time a block is diagnosed or for each block to be diagnosed. Besides the fixed pattern data test using fixed bit patterns, a check board test, waking bit test, or pseudorandom data test can be used. Changing the bit pattern of validation data 92, failure from some stuck bit data can be detected.

Figure 7:
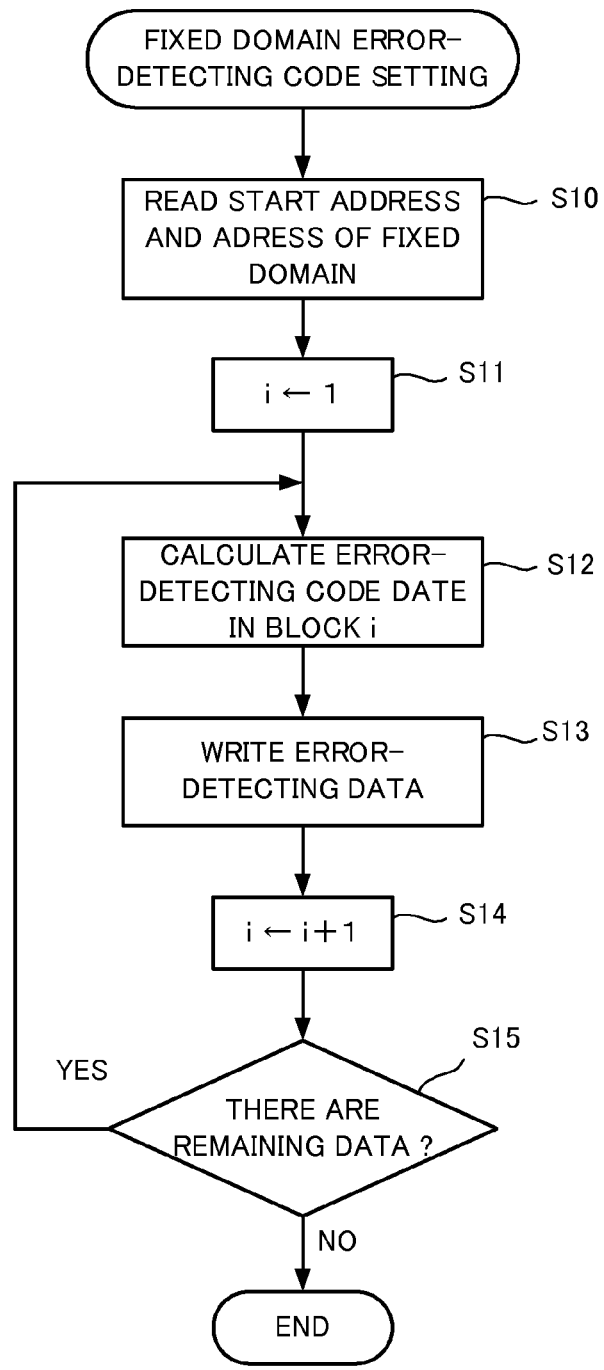
FIG. 7 is a flowchart showing an exemplary operation for setting fixed domain error-detecting codes according to Embodiment 1.

FIG. 7 is a flowchart showing an exemplary operation for setting error-detecting codes for the fixed domain according to Embodiment 1. The procedure of FIG. 7 starts after the process execution device 100 is activated and the program data 71 are loaded on the fixed domain 8 of the RAM 7 from the ROM 6.

The fixed domain diagnostic part 2 reads the start address and end address of the fixed domain 8 (Step S10). It is assumed that these data are set in the program data 71. A block number variable i is initialized to 1 (Step S11) and an error-detecting code 81 for the data in the block i of the fixed domain 8 is calculated (Step S12). The error-detecting code 81 can be given by data in the ROM 6. Then, the error-detecting code 81 is written in a given part of the fixed domain 8 (Step S13).

When the error-detecting code 81 consists of a CRC code, the CRC code of the block #1 is written in #1CRC as shown in FIG. 5. When the error-detecting code 81 consists of bit-inverted data, the program data 71 are bit-inverted and written as shown in FIG. 4.

The fixed domain diagnostic part 2 increments the block number variable i (Step S14) and, if there is a block (remaining data) with that number (Step S15; YES), calculates an error-detecting code 81 for the data in that block. If there is no block (remaining data) with the number i (Step S15; NO), the error-detecting code setting procedure ends.

Figure 8:
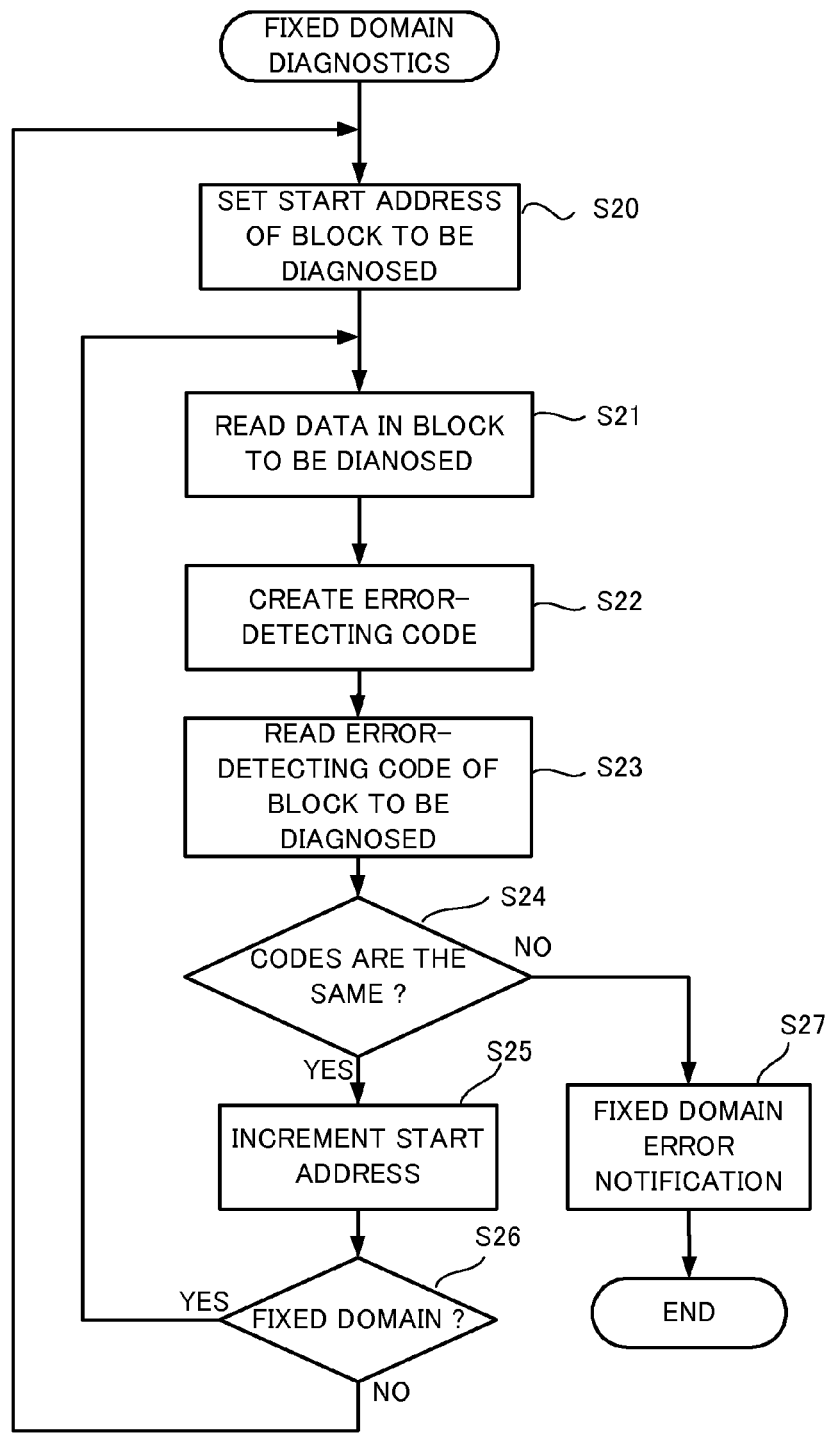
FIG. 8 is a flowchart showing an exemplary fixed domain diagnostic operation according to Embodiment 1.

FIG. 8 is a flowchart showing an exemplary operation of the fixed domain diagnostics according to Embodiment 1. For example, the fixed domain diagnostic procedure normally operates as a task of lower priority than processing of the process execution part 5.

The fixed domain diagnostic part 2 sets the start address of the block to be diagnosed (Step S20) and reads data in the block to be diagnosed (Step S21). Then, the fixed domain diagnostic part 2 creates an error-detecting code from the read data (Step S 22). For error detection by the CRC scheme, a CRC code is calculated. When the error-detecting code 81 consists of bit-inverted data as shown in FIG. 4, the read data are bit-inverted to create data.

The fixed domain diagnostic part 2 reads the error-detecting code 81 for the block to be diagnosed (Step S23) and compares it with the error-detecting code created in the Step S22 (Step S24). If the codes are the same (Step S24; YES), it is determined that the data in the diagnosed block are normal and the next block will be diagnosed. In other words, the start address of the block to be diagnosed is incremented by a block (Step S25). If it is the fixed domain 8 (Step S26; YES), returning to the Step S21, the processing is repeated starting with reading the block to be diagnosed. If it is not the fixed domain 8 (Step S26; NO), returning to the Step S20, the diagnostic test is repeated from the first block of the fixed domain 8.

If the error-detecting code created in the Step S22 and the read error-detecting code 81 of the block to be diagnosed are not equal (Step S24; NO), it is determined that the diagnosed block has abnormal data. The diagnostic result notifying part 4 notifies the process execution part 5 that the fixed domain 8 has an error (Step S27). If the program data have an error, the fixed domain diagnostic part 2 ends the procedure.

Figure 9:
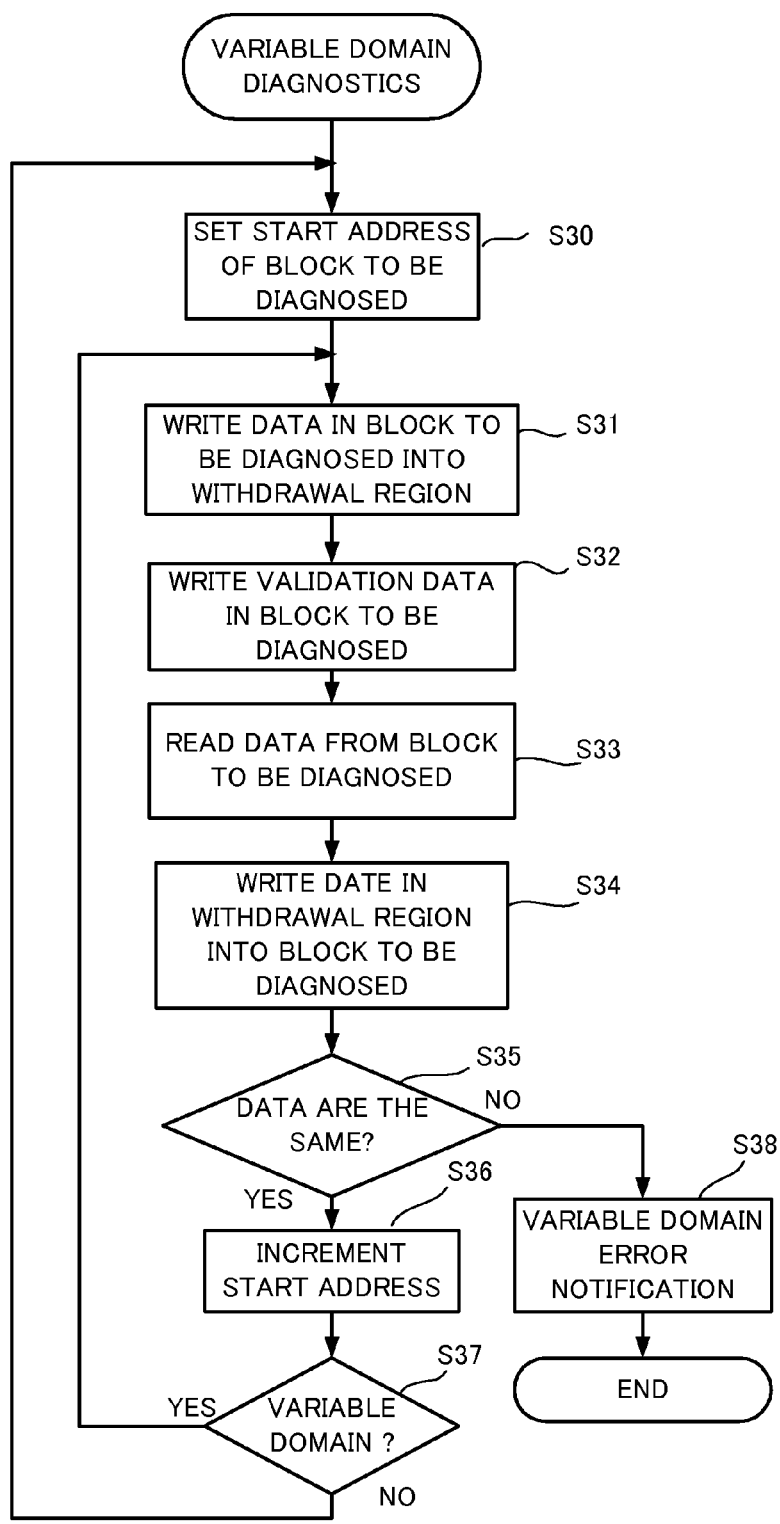
FIG. 9 is a flowchart showing an exemplary variable domain diagnostic operation according to Embodiment 1.

FIG. 9 is a flowchart showing an exemplary operation of the variable domain diagnostics according to Embodiment 1. The variable domain diagnostic part 3 sets the start address of the block to be diagnosed (Step S30) and writes data in the block to be diagnosed in the withdrawal region 91 (Step S31). Then, the variable domain diagnostic part 3 writes validation data 92 in the block to be diagnosed (Step S32). As described above, the validation data 92 are a fixed bit pattern, a check board test, a walking bit test, or a pseudorandom test data.

The variable domain diagnostic part 3 reads data from the block to be diagnosed (Step S33) and writes the data in the withdrawal region 91 in the block to be diagnosed (Step S34). The withdrawn data can be returned at any time after the written data are read from the block to be diagnosed. The variable domain diagnostic part 3 compares the data read in the Step S33 and the validation data 92 (Step S35). If they are the same (Step S35; YES), it is determined that the diagnosed block is normal and the next block will be diagnosed. In other words, the start address of the block to be diagnosed is incremented (Step S36) and, if it is the variable domain 9 (Step S37; YES), returning to the Step S31, the processing is repeated starting with drawing the data in the block to be diagnosed. If it is not the variable domain 9 (Step S37; NO), returning to the Step S30, the diagnostic test is repeated from the first block of the variable domain 9.

If the data read in the Step S33 and the validation data 92 are not the same (Step S35; NO), it is determined that the diagnosed block is abnormal. The diagnostic result notifying part 4 notifies the process execution part 5 that the variable domain 9 has an error (Step S38). If the program data 71 have an error, the variable domain diagnostic part 3 ends the procedure.

As described above, the variable domain diagnostic test conducted while at least the processes using the withdrawn data are in their wait state, and desirably while all processes are in their wait state. Furthermore, if the process execution part 5 returns from a wait state in the middle of variable domain diagnostics (more precisely, after the start of writing the validation data 92 and before the start of writing the data in the withdrawal region 91 into the diagnosed block), the diagnostic procedure on the block under diagnostics is discontinued and the withdrawn data are written in the original block. In such a case, the diagnostic procedure resumes with writing the data in the block to be diagnosed into the withdrawal region 91 when the process execution part 5 is in a wait state (Step S31).

As described above, the process execution device 100 of Embodiment 1 can have the fixed domain 8 storing data that are not rewritten by the process execution part 5, such as program data 71, diagnosed without rewriting the data. Consequently, the program counters of the CPU 21 and the like can be diagnosed regardless of the states of processes; therefore, the memory diagnostic program can be simplified. Then, the variable domain 9 storing data that are possibly rewritten by the process execution part 5, such as the variables 72 or CPU stack 75, are diagnosed by comparison of written and read given validation data 92 without using error-detecting codes. Consequently, even if the process execution part 5 rewrites data, there is no need to rewrite the comparing data or calculating error-detecting codes.

According to Embodiment 1, even if the memory used by a process has both the fixed domain 8 and the variable domain 9, the memory used by the process can relatively easily be diagnosed during execution of the process. Furthermore, all data regions can easily be diagnosed without losing or damaging the data in the RAM 7.

Embodiment 2

Figure 10:
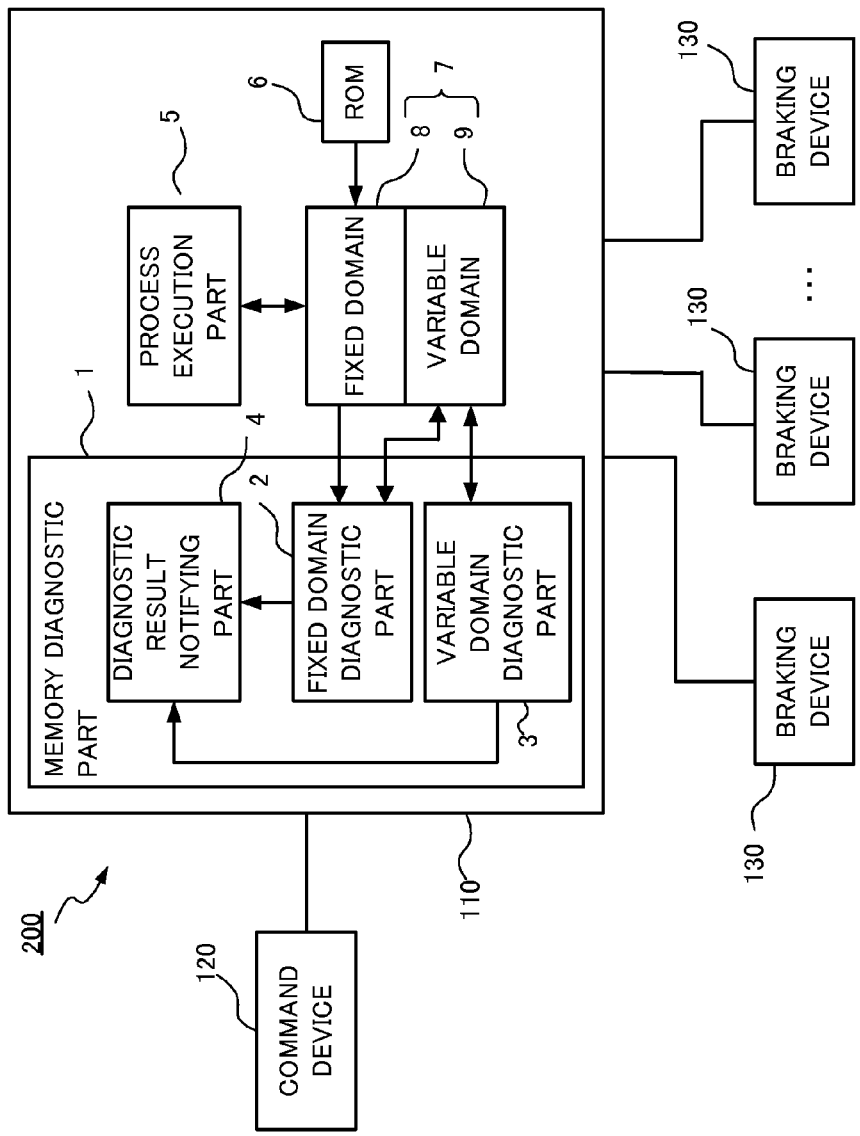
FIG. 10 is a block diagram showing an exemplary configuration of the brake control system according to Embodiment 2 of the present invention.

FIG. 10 is a block diagram showing an exemplary configuration of the brake control system according to Embodiment 2 of the present invention. A brake control system 200 of Embodiment 2 uses the process execution device 100 of Embodiment 1 as a railcar brake control device 110. The brake control system 200 is composed of a command device 120, a brake control device 110, and braking devices 130. The brake control device 110 communicates with the braking devices 130 of the cars constituting a railcar via an inter-car network (not shown). The command device 120 gives commands on deceleration of the entire cars to the brake control device 110.

The brake control device 110 gives commands on the braking force corresponding to the excess weight of each car to the braking device 130 of the car. The excess weight of each car is detected by the braking device 130 and sent to the brake control device 110. Furthermore, the brake control device 110 receives the wheel rotation speed of each car from the braking device 130 and detects the sliding state of wheels. During deceleration, based on the wheel with the highest rotation speed (circumferential velocity) as a rule, the lower rotation speed wheels can be considered to be sliding. The brake control device 110 commands the sliding wheels to reduce the braking force. Then, the brake control device 110 distributes the reduced braking force among other not-sliding wheels and gives a command for the increased braking force to their braking devices 130 so that the entire car achieves the commanded reduced speed.

The brake control device 110 has the same configuration as the process execution device 100 in FIG. 1. In FIG. 10, the communication part for communication between the brake control device 110 and command device 120 and between the brake control device 110 and braking devices 130 is omitted. The process execution part 5 of the brake control device 110 executes the above-described brake control procedure as a process. The memory diagnostic part 1 of the brake control device 110 conducts diagnostics on the RAM 7 of the brake control device 110 during operation of the brake control device 110, namely during normal operation of the railcar. The memory diagnostic part 1 of the brake control device 110 conducts diagnostics on the RAM 7 as in Embodiment 1.

The brake control device 110 calculates the braking force of each car based on a deceleration command and the car speed, car excess weight, wheel rotation speed, and the like in a given cycle, for example in every 10 msec. Furthermore, the brake control device 110 detects the sliding state and calculates the braking force. The memory diagnostic part 1 conducts the above-described diagnostics while no arithmetic processing of the process execution part 5 is executed.

Since the wheel rotation speed change is the greatest among state changes, the wheel rotation speed is generally detected in the shortest cycle in railcar brake control. For example, when interruption for the wheel rotation speed detection occurs in a cycle of 5 msec., the memory diagnostic part 1 sets the size of a block to be diagnosed so that at least data in the variable domain 9 are withdrawn and validation data are written and read in a short time during which the speed interrupt procedure does not occur, for example in 500 μsec.

The variable domain 9 is diagnosed by block as explained using the flowchart of FIG. 9. In the case of railcar brake control, one block is diagnosed during the speed interrupt. The blocks are diagnosed in sequence upon each interrupt processing. After all blocks of the variable domain 9 are diagnosed, the diagnostics on the blocks is repeated from the first one.

The diagnostics on the fixed domain 8 can be paused at any time as described in Embodiment 1. Therefore, it can be conducted in idle times as the lowest priority task.

As described above, the brake control device 110 of Embodiment 2 can relatively easily conduct diagnostics on the entire RAM 7 used by the brake control device 110 during normal operation of the railcar. Since diagnostics are performed on the RAM 7 during operation of the railcar, any abnormal state of the RAM 7 can be detected even if it occurs during the operation and at least an emergency stop can be made to prevent risks. Furthermore, when the brake control device 110 has a redundant structure, the standby system can be started to continue the operation. Then, the abnormal part can be inspected and replaced at an appropriate safe place and time. In this way, the functional safety of a railcar can be ensured.

Here, the configuration of the memory diagnostic part 1 and the like of Embodiment 2 is applicable not only to the brake control device 110 but also any railcar control device using memory.

Embodiment 3

Figure 11:
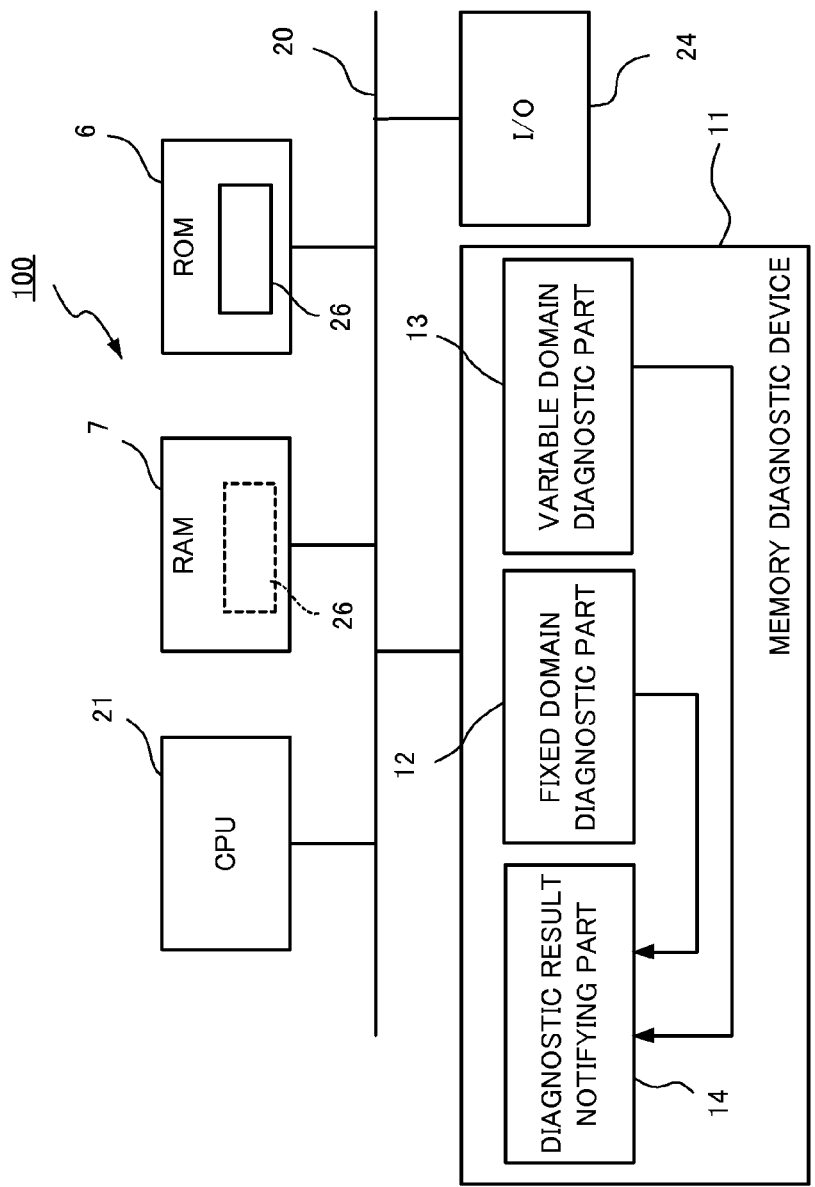
FIG. 11 is a block diagram showing an exemplary configuration of the process execution device according to Embodiment 3 of the present invention.

FIG. 11 is a block diagram showing an exemplary configuration of the process execution device according to Embodiment 3 of the present invention. In Embodiment 3, a memory diagnostic device 11 is provided separately from the CPU 21 realizing the process execution part 5. The memory diagnostic device 11 is connected to the internal bus 20 of the process execution device 100 so as to be able to read/write the RAM 7 used by the process execution part 5.

The process execution device 100 is composed of the same CPU 21, RAM 7, ROM 6, and I/O 24 as those in Embodiment 1. However, control programs 26 loaded onto the RAM 7 include programs for the process execution part 5 but not programs for the memory diagnostic device 11. In Embodiment 3, the control programs 26 stored in the ROM 6 and loaded onto the RAM 7 run on the CPU 21 to implement processing of the process execution part 5.

The memory diagnostic device 11 is composed of a separate hardware from the process execution part 5. The memory diagnostic device 11 reads/writes the RAM 7 via the internal bus 20. The memory diagnostic device 11 comprises a fixed domain diagnostic part 12, a variable domain diagnostic part 13, and a diagnostic result notifying part 14 as the memory diagnostic part 1 of Embodiment 1 and operates as the memory diagnostic part 1. The memory diagnostic device 11 can be composed of, for example, a microcomputer, FPGA (field programmable gate array), or dedicated LSI.

After program data are loaded onto the RAM 7 from the ROM 6, the memory diagnostic device 11 is activated and the fixed domain diagnostic part 12 adds an error-detecting code 81 to the fixed domain 8 of the RAM 7. The start address and end address of the fixed domain 8 are given, for example, in an initialization procedure by the control programs 26.

The fixed domain diagnostic part 12 compares the error-detecting code calculated from data read from the fixed domain 8 with the error-detecting code added earlier to determine whether there is any data error during processing of the process execution part 5. In Embodiment 3, the fixed domain diagnostic part 12 can execute the procedure at any time as long as there is no conflict between reading data from the RAM 7 and reading/writing data in any other process. Therefore, the procedure can be normally run provided that it is paused upon start of reading/writing data in any other process.

The variable domain diagnostic part 13 conducts diagnostics as to whether the variable domain 9 of the RAM 9 operates normally during processing of the process execution part 5. For diagnostics on the variable domain 9, data stored in the variable domain 9 are temporarily stored in a different region not storing those data, known data are written in the variable domain 9 where the data were stored, the data are read from the region, and it is determined whether the data are equal to the written known data.

The variable domain diagnostic part 13 conducts diagnostics on the variable domain 9 while all processes of the process execution part 5 are in their wait state. The process execution part 5 makes the CPU 21 give notice that process execution part 5 is in a wait state via the internal bus 20. For example, the CPU 21 turns on/off a flag provided in the memory diagnostic device 11 to give notice as to whether the process execution part 5 is in a wait state.

When the fixed domain diagnostic part 12 or variable domain diagnostic part 13 detects the RAM 7 having failure, the diagnostic result notifying part 14 notifies the process execution part 5 that the fixed domain 8 or variable domain 9 has an error.

The withdrawal region 91 temporarily storing data in the variable domain 9 can be provided within the memory diagnostic device 11. In such a case, the withdrawal region 91 within the memory diagnostic device 11 is also the target of variable domain diagnostics.

The memory diagnostic device 11 of Embodiment 3 operates in the same manner and yields the same effect as the memory diagnostic part 1 of Embodiment 1.

The embodiments disclosed above are given by way of example and should be considered to be not restrictive. The scope of the present invention is set forth in the scope of claims, not in the above explanation, and includes any modifications made within the significance and scope equivalent to the scope of claims.

In addition, the above-described hardware configurations and flowcharts are given by way of example and any modifications and changes can be made.

The core part for implementing processing for the memory diagnosis part 1 composed of the CPU 21, RAM 7, ROM 6, internal bus 20, and the like can be realized by a conventional computer system instead of a dedicated system. For example, computer programs for executing the above-described operations can be stored and distributed on a computer-readable recording medium (a flexible disc, CD-ROM, DVD-ROM, etc.) and installed on a computer to configure the memory diagnosis part 1 executing the above-described procedures. Furthermore, the computer programs can be stored in a storage device of a server unit on a communication network such as the Internet and downloaded by a conventional computer system to configure the memory diagnosis part 1.

Furthermore, when the functions of the memory diagnostic part is realized by apportionment between an OS (operation system) and application programs or cooperation of an OS and application programs, only the application programs can be stored in a storage medium or storage device.

Furthermore, the computer programs can be superimposed on carrier waves to distribute them via a communication network. For example, the computer programs can be posted on a bulletin board system (BBS) of a communication network to distribute them via the network. Then, the computer programs can be activated and executed in a manner similar to other application programs under the control of an OS so that the above-described procedures are executed.

DESCRIPTION OF THE NUMERICAL REFERENCE

1 Memory diagnostic part
2 Fixed domain diagnostic part
3 Variable domain diagnostic part
4 Diagnostic result notifying part
5 Process execution part
6 ROM
8 Fixed domain
9 Variable domain
11 Memory diagnostic device
12 Fixed domain diagnostic part
13 Variable domain diagnostic part
14 Diagnostic result notifying part
20 Internal bus
21 CPU
24 I/O
25 Control program
81 Error-detecting code
91 Withdrawal region
92 Validation data 100 Process execution device
110 Brake control device
120 Command device
130 Braking device
200 Brake control system

The invention claimed is:

1. A memory diagnostic method of diagnosing a memory used by a process during execution of the process, comprising:

a variable domain diagnostic step with a variable domain of the memory storing first data that are possibly subject to writing by the process, comprising storing the first data stored in the variable domain in a withdrawal region different from the memory region storing the first data, writing known data in the variable domain where the first data stored in the withdrawal region were stored, and reading data in the withdrawal region and determining whether the data is same as the written known data; and a fixed domain diagnostic step with a fixed domain of the memory storing second data that are not subject to change during execution of the process, the fixed domain divided into two or more parts, the fixed domain diagnostic step comprising adding an error-detecting code for each part of the fixed domain and storing the error-detecting code for each part in the fixed domain in advance, and comparing the error-detecting code calculated from data read from a part of the fixed domain with the added and stored error-detecting code of the same part of the fixed domain to determine whether there is any data error.

2. The memory diagnostic method according to claim 1, wherein the variable domain diagnostic step or the fixed domain diagnostic step is conducted on all regions of the memory used by the process.

3. The memory diagnostic method according to claim 1, wherein the variable domain diagnostic step or the fixed domain diagnostic step is conducted while all processes but the variable domain diagnostic step and the fixed domain diagnostic step using the memory used by the process are in their wait state.

4. The memory diagnostic method according to claim 1, wherein the variable domain diagnostic step comprises dividing the variable domain into two or more parts, storing the first data stored in the variable domain in the withdrawal region on the basis of the divided parts, writing known data in the variable domain where the first data stored in the withdrawal region were stored, and reading data from the withdrawal region and determine whether the data is same as the written known data.

5. The memory diagnostic method according to claim 1, wherein the variable domain diagnostic step includes a check board test, a walking bit test, a pseudorandom data test, or a fixed pattern data test.

6. The memory diagnostic method according to claim 1, wherein the fixed domain diagnostic step includes error detection using duplication, parity codes, checksums, Hamming codes, cyclic codes, or Hash functions.

7. The memory diagnostic method according to claim 1, wherein:

the process conducts a control procedure for a railcar; and
the variable domain diagnostic step and the fixed domain diagnostic step are conducted while normal operation of the railcar.

8. The memory diagnostic method according to claim 7, wherein the variable domain diagnostic step is conducted while no arithmetic operation of the process is executed.

9. The memory diagnostic method according to claim 8, wherein the variable domain diagnostic step is conducted on one or two or more divided parts of the variable domain in sequence in a given cycle during which no arithmetic operation of the process is executed and, after the variable domain diagnostic step is conducted on all divided parts of the variable domain, the variable domain diagnostic step is conducted again from a first one of the parts of the variable domain.

10. A memory diagnostic device diagnosing a memory used by a process during execution of the process, comprising:

a variable domain diagnostic part that, with a variable domain of the memory storing first data that are possibly subject to writing by the process, stores the first data stored in the variable domain in a withdrawal region different from the memory region storing the first data, writes known data in the variable domain where the first data stored in the withdrawal region were stored, and reads data in the withdrawal region and determines whether the data is same as the written known data; and a fixed domain diagnostic part that, with a fixed domain of the memory storing second data that are not subject to change during execution of the process, divides the fixed domain into two or more parts, adds an error-detecting code for each part of the fixed domain and stores the error-detecting code for each part in the fixed domain in advance, and compares the error-detecting code calculated from data read from a part of the fixed domain with the added and stored error-detecting code of the same part of the fixed domain to determine whether there is any data error.

11. A non-transitory computer-readable storage medium on which is recorded a memory diagnostic program allowing a computer to execute the following steps while the computer executes a process:

a variable domain diagnostic step with a variable domain of a memory storing first data that are possibly subject to writing by the process, comprising storing the first data stored in the variable domain in a withdrawal region different from a memory region storing the first data, writing known data in the variable domain where the first data stored in the withdrawal region were stored, and reading data in the withdrawal region and determining whether the data is same as the written known data; and a fixed domain diagnostic step with a fixed domain of the memory storing second data that are not subject to change during execution of the process, the fixed domain divided into two or more parts, the fixed domain diagnostic step comprising adding an error-detecting code for each part of the fixed domain and storing the error-detecting code for each part in the fixed domain in advance, and comparing the error-detecting code calculated from data read from a part of the fixed domain with the added and stored error-detecting code of the same part of the fixed domain to determine whether there is any data error.

* * * * *